US009146550B2

(12) United States Patent
Maravelias et al.

(10) Patent No.: US 9,146,550 B2
(45) Date of Patent: Sep. 29, 2015

(54) COMPUTERIZED SYSTEM FOR CHEMICAL PRODUCTION SCHEDULING

(75) Inventors: Christos T. Maravelias, Middleton, WI (US); Sara Zenner, Madison, WI (US); Arul Sundaramoorthy, Boston, MA (US)

(73) Assignee: Wisconsin Alumni Research Foundation, Madison, WI (US)

( * ) Notice: Subject to any disclaimer, the term of this patent is extended or adjusted under 35 U.S.C. 154(b) by 534 days.

(21) Appl. No.: 13/561,891

(22) Filed: Jul. 30, 2012

(65) Prior Publication Data

US 2014/0031963 A1     Jan. 30, 2014

(51) Int. Cl.
*G06F 19/00*     (2011.01)
*G05B 17/02*     (2006.01)

(52) U.S. Cl.
CPC ..................................... *G05B 17/02* (2013.01)

(58) Field of Classification Search
CPC .................................................. G05B 19/418
USPC ............................... 700/97; 703/10; 718/102
See application file for complete search history.

(56) References Cited

U.S. PATENT DOCUMENTS

| | | | | |
|---|---|---|---|---|
| 2003/0154144 A1* | 8/2003 | Pokorny et al. | | 705/28 |
| 2007/0061049 A1* | 3/2007 | Masuda et al. | | 700/291 |
| 2009/0021775 A1* | 1/2009 | Rai | | 358/1.15 |
| 2009/0025003 A1* | 1/2009 | Rai | | 718/102 |
| 2009/0094087 A1* | 4/2009 | Chung et al. | | 705/9 |
| 2013/0246032 A1* | 9/2013 | El-Bakry et al. | | 703/10 |

OTHER PUBLICATIONS

Carlos A. Mendez et al., State-of-the-art review of optimization methods for short-term scheduling of batch processes, Science Direct, Jun. 30, 2005 (on-line Apr. 17, 2006), Computers & Chemical Engineering, Carnegie Mellon University, Pittsburgh, USA, www.sciencedirect.com.

* cited by examiner

*Primary Examiner* — Robert Fennema
*Assistant Examiner* — Anthony Whittington
(74) *Attorney, Agent, or Firm* — Boyle Fredrickson, S.C.

(57) ABSTRACT

A scheduling system for chemical processing provides an electronic computer that models the process as a set of tasks with known production ranges. A desired output from the process is back projected through the process to determine production quantities of each task of the process within the production ranges. These values are used to constrain a mixed integer programming evaluation of the schedule which may be used to control operation of the equipment.

16 Claims, 4 Drawing Sheets

| 1 | $\omega_{S6} = 75$ | Customer demand |
| | $\omega_{S7} = 50$ | Customer demand |
| 2 | $\mu_{T3} = 75$ | To produce S6 |
| | $\mu_{T4} = 50$ | To produce S7 |
| 3 | $\omega_{S4} = 0.4 * 50 = 20$ | Required by T4 |
| | $\omega_{S5} = 75 + 0.6 * 50 = 105$ | Required by T3 and T4 |
| 4 | $\mu_{T1} = 105$ | To produce S5 |
| 5 | $\omega_{S3} = 0.2 * 105 = 21$ | Required by T1 |
| 6 | $\mu_{T2} = \max\{21/0.6, 20/0.4\} = 50$ | To produce sufficient S3 and S4 |

COMPUTERIZED SYSTEM FOR CHEMICAL PRODUCTION SCHEDULING

This invention was made with government support under 0547443 and 1066206 awarded by the National Science Foundation. The government has certain rights in the invention.

CROSS REFERENCE TO RELATED APPLICATION

--

BACKGROUND OF THE INVENTION

The present invention relates to methods of scheduling chemical production equipment in a factory or the like and in particular to an improved computerized method for scheduling equipment related to such chemical production.

The manufacturing of chemicals and materials may provide a system receiving raw materials and processing the materials in multiple batches or tasks, each associated with a process or equipment, to produce a final product. Ideally, each of the tasks may be scheduled to maximize the efficient utilization of the equipment and to minimize the total processing time of the material.

Such scheduling problems are often formulated as mixed integer programming models that may be run on electronic computers. Mixed integer programming (MIP) is a class of linear programming problems widely used in industry to find solutions to optimization problems. In a mixed integer programming problem, some of the unknown variables are integers and some are non-integers.

Such programming problems are generally NP-hard, practically demanding extensive computer processing time that ultimately may be a barrier to a solution or to finding a solution fast enough for practical application to a factory environment.

SUMMARY OF THE INVENTION

The present invention performs a "back projection" analyzing the chemical processing quantities from an output of a process to its input to provide constraints to the MIP modeling of the process that can substantially increase processing speed. The back projection considers production quantities in light of the actual production capabilities of the equipment or processes thus eliminating the evaluation of unrealizable schedules.

Specifically, the present invention provides a system for scheduling manufacturing production in a multistep process having a set of tasks that may receive upstream input materials to produce downstream output materials. The system provides an electronic computer having an electronic memory storing: (a) a model of the multistep process, the model defining an interconnection of the tasks according to a downstream material flow from a front end to a back end and defining, for each task, achievable ranges of production of material by the task; and (b) a desired amount of output materials from the multistep process. The electronic computer executes a stored program to: (a) determine minimum material amounts output from each task in light of the desired output; (b) determine minimum production for each task comporting with the ranges of production for the tasks to provide an attainable production for each task; and (c) use the attainable productions for each task to provide tightening constraints to a time-indexed MIP scheduling of the manufacturing process.

It is thus an object of at least one embodiment of the invention to provide a simple method of constraining the search space of the linear programming. The back projection process using the known task ranges provides tightening constraints that can provide substantial computational speed improvements.

The stored program may perform a multi-step back propagation from a back end of the model toward the front end of the model with the steps alternately: (i) determining minimum amounts of output from given tasks based on the desired output of the multistep process or minimum productions of tasks immediately downstream from the given tasks; and (ii) determining minimum productions of the given tasks based on the minimum amounts.

It is thus an object of at least one embodiment of the invention to provide a simple methodology widely applicable to a variety of manufacturing processes.

The model may include task realization values indicating a fraction of the material input to the task that may be consumed or produced by the task.

It is thus an object of at least one embodiment of the invention to provide a model that accurately reflects process efficiencies.

The model may include an initial inventory of material.

It is thus an object of at least one embodiment of the invention to take into account limited reserves of materials.

The minimum production for each task i may be determined according to the equation:

$$\mu_i = \max_{s \in S_i^+} \{\omega_s / \rho_{is}^+\}$$

where:
$\mu_i$ is the minimum production for task i;
$\omega_s$ is the minimum required amount of material state s to meet customer demand;
$\rho_{is}^+$ is the realization of task i indicating the amount of material state s produced by the task; and
$S_i^+$ is the set of material states produced by task i;

It is thus an object of at least one embodiment of the invention to provide a simple method for determining minimum production suitable for an iterative back projection.

The minimum material amount for each state s may be determined according to the equation:

$$\omega_s = \max\left\{0, \sum_{i \in I_s} \rho_{is}^- \mu_i - \zeta_s^0\right\}$$

where:
$\omega_s$ is the minimum required amount of material state s;
$\rho_{is}^-$ is the realization of task i indicating the amount of material state s consumed by the task;
$\mu_i$ is the minimum production for task i; and
$\zeta_s^0$ is the initial inventory of material state s.

It is thus an object of at least one embodiment of the invention to provide material values as a tightening constraint.

The model may include a recycle path providing an interconnection from a downstream task to an input of an upstream task and wherein the electronic computer executes the stored program to perform multiple iterations of the back projection with initial assumption of zero material flow through the recycle path.

It is thus an object of at least one embodiment of the invention to accommodate complex manufacturing arrangements including those with material flows moving backward in loops.

Alternatively or in addition the model may provide for parallel connected tasks and wherein the minimum production is determined by linear programming to find:

$\mu_i = \min P_i$ such that:

$$\zeta_s^0 + \sum_{i' \in I_s^+} \rho_{i's}^+ P_{i'} \geq \sum_{i' \in I_s^-} \rho_{i's}^- P_{i'} \; \forall \, s$$

$$\sum_{i' \in I_s^+} \rho_{i's}^+ P_{i'} \geq \omega_s \; \forall \, s \in S^k$$

where:

$\mu_i$ is the minimum production for task i;

$P_i$ is a nonnegative variable denoting the total amount of material that task i produces for a particular solution of the linear programming problem;

$\omega_s$ is the minimum material amount for each material state s;

$I_s^-/I_s^+$ is the set of tasks that consume/produce material state s;

$\rho_{is}^-/\rho_{is}^+$ is the realization of task i indicating the amount of material state s consumed/produced by the task; and $\zeta_s^0$ is the initial inventory of material state s.

It is thus an object of at least one embodiment of the invention to accommodate processes that provide for parallel or alternative material flows.

These particular features and advantages may apply to only some embodiments falling within the claims and thus do not define the scope of the invention.

DETAILED DESCRIPTION OF THE PREFERRED EMBODIMENT

Figure 1:
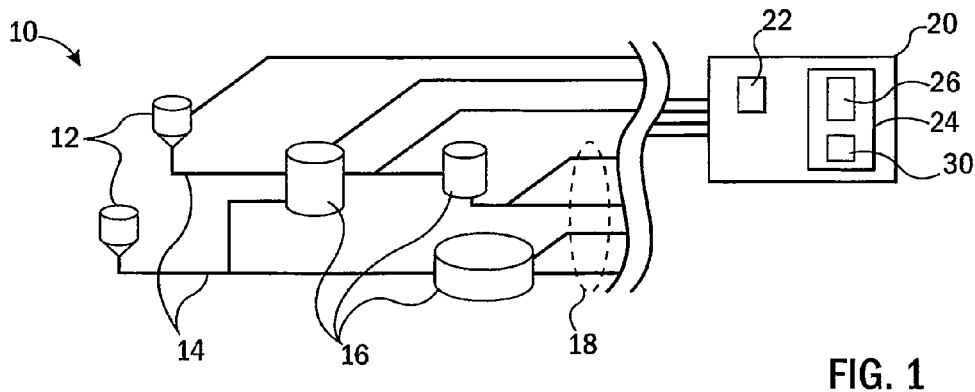
FIG. 1 is a simplified diagram of a chemical manufacturing process showing tasks and interconnecting paths of material flow as may be monitored and/or controlled by an electronic computer executing the present invention.

Referring now to FIG. 1, a chemical production system 10 may provide for a variety of raw material sources 12 that provide material streams 14, for example, through pipelines or other conveyor systems to batch processing units 16 which receive and process those materials to provide outputs to other batch processing units 16 or to an output stream 18.

Each of the batch processing units 16 and the material flows may be monitored and/or controlled by electronic computer 20 having a processor 22 communicating with a memory 24 executing a stored program 26. The memory 24 may also include data 30 providing a model of the chemical production system 10 and various operating parameters including the amount of raw materials provided by the raw material sources 12, the processing capabilities of each of the batch processing units 16, the topology of their interconnection, and the desired amount of different materials in the output stream 18.

Generally the model of data 30 may be used to determine an optimum control setting point for the material flows and the batch processing units 16. The batch processing unit 16, for example, may be reactors, distillers, mixers, filters, coolers, and other well-known equipment used in the chemical processing area.

Figure 2:
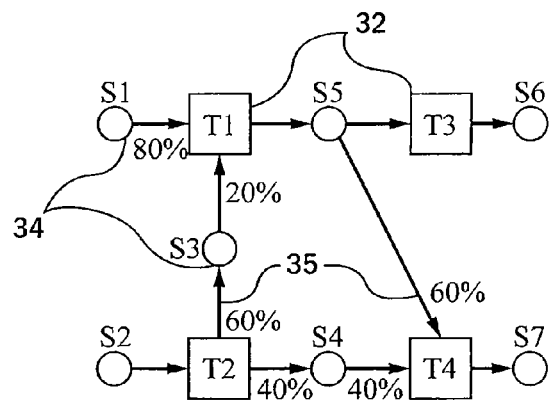
FIG. 2 is a simplified block diagram of a process and a table showing steps of back projection of the present invention.

Referring now to FIG. 2, a given chemical production system 10 may be abstracted to provide a set of tasks 32 representing generally batch processing units 16. Each of the tasks 32 may be associated with states 34 representing the input of given materials to the task and the output of materials from that task. Flow of material among the tasks is indicated by path arrows 35.

Consider a general facility consisting of processing units, j∈J, with a set of processing tasks, i∈I, and states (materials) s∈S. First, we must find the minimum production of a task $\mu_i$ and the minimum amount required for a state $\omega_s$ where, for final products $\omega_s$ is the customer demand. Parameters and $\mu_i$ and $\omega_s$ are calculated sequentially by back-propagating the demand. When we know $\omega_s$ ($\mu_i$) for all states (tasks) produced by task i (consuming state s), we can calculate $\mu_i$ ($\omega_s$) using equations 1 and 2 as follows:

$$\mu_i = \max_{s \in S_i^+} \{\omega_s / \rho_{is}^+\} \quad (1)$$

where:

$\mu_i$ is the minimum production for task i;

$\omega_s$ is the minimum required amount of material state s;

$\rho_{is}^+$ is the realization of task i indicating the amount of material state s produced by the task;

$S_i^+$ is the set of material states produced by task i; and $$\omega_s = \max\left\{0, \sum_{i \in I_s^-} \rho_{is}^- \mu_i - \zeta_s^0\right\} \quad (2)$$

where:

$\omega_s$ is the minimum required amount of material state s;

$\rho_{is}^-$ is the realization of task i indicating the amount of material state s consumed by the task;

$\mu_i$ is the minimum production for task i; and $\zeta_s^0$ is the initial inventory of material state s.

In the above equations, $S_i^+$ ($I_s^-$) is the set of states (tasks) produced by (consuming) task i (state s), $\zeta_s^0$ is the initial inventory of state s, and $\rho_{is}^+$ ($\rho_{is}^-$) is the fraction of material state s produced (consumed) by task i.

In equation 1, the term inside the brackets is the total amount task i must process to meet the demand for state s. We take the maximum over all states produced by task i to ensure the task satisfies demand for all states. In equation 2, $\omega_s$ is the amount of intermediate s required by all tasks consuming it minus any initial inventory and must be at least zero.

After calculating $\mu_i$, we find the minimum attainable production amount $\tilde{\mu}_i$ (as described further below) which provides a tighter lower bound on the required production of task i and should be used in place of $\mu_i$ in equation 2. For example, if the only unit for a task has a capacity of 30-40 kg and the task must produce at least 50 kg, the minimum attainable production is 60 kg. We back-propagate demand until $\omega_s$ and $\mu_i$ are known for all states and tasks. An illustrative example is shown in FIG. 2. In FIG. 2, product demand is back propagated to the network. Each group in the table represents one sequence of calculation and descriptions of each calculation are given on the right.

Figure 3:
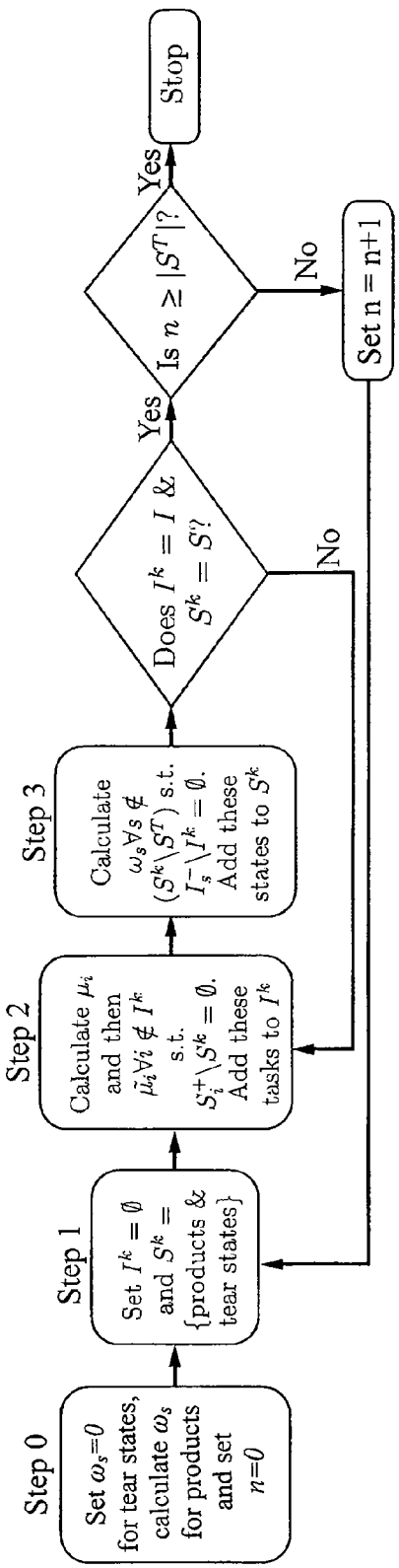
FIG. 3 is a flowchart of program steps executable by an electronic computer showing the steps of using the present invention when recycle streams exist in the process.
Figure 4:
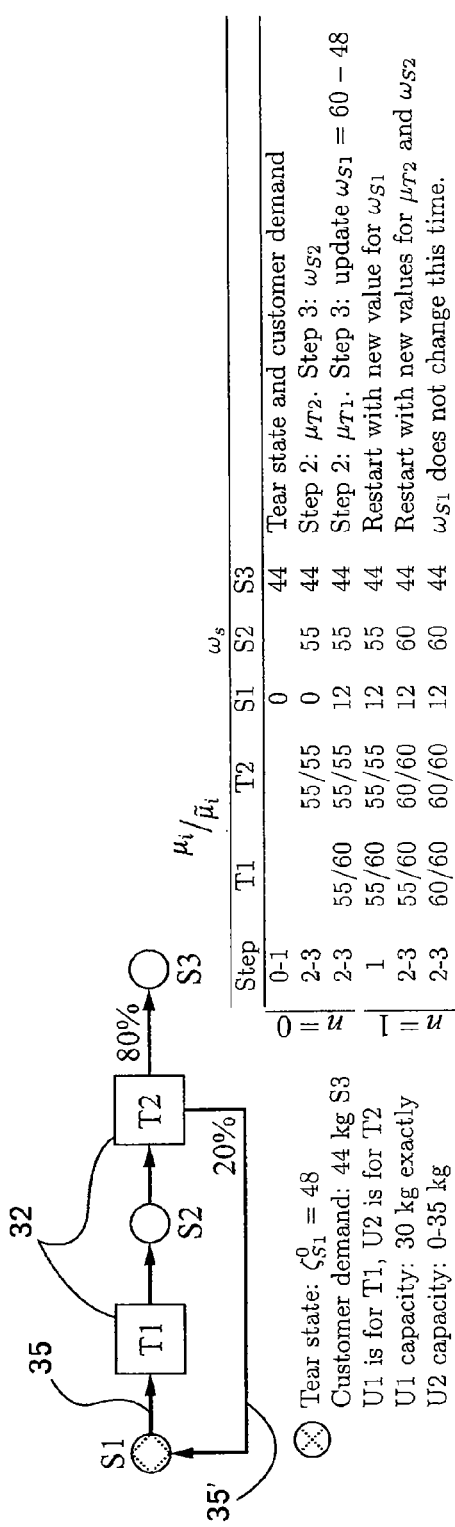
FIG. 4 is a simplified block diagram of a recycle stream and a table showing the steps of application of the invention to that stream.

The above described chemical production system 10 abstracted in FIG. 2 provides only forward flows of material. Referring now to FIGS. 3 and 4, the present invention can also be applied to cases where materials flow upstream (as indicated by path arrows 35'), for example, from later tasks 32 and earlier tasks 32.

For chemical production systems 10 with recycle loops, we must tear all loops. First, we choose a state in each loop, called the "tear state", and initialize $\omega_s=0$. Next, we back-propagate demand as before and eventually calculate an updated value for $\omega_s$ for the tear state. Using the updated value, we back-propagate demand through the network a second time; this is repeated for each tear state. For any feasible instance, we only need to update $\omega_s$ for each tear state once. FIG. 3 provides a description of a computer program executable on the computer 20 for back-propagation, where $I^k$ ($S^k$) is the set of tasks (states) for which $\mu_i$ ($\omega_s$) is known, and $S^T$ is the set of tear states. Note that $\omega_s$ is recalculated for tear states in step 3, and the updated value is used in the next iteration.

Referring to the example of FIG. 4, each row in the table represents steps 0 and 1 or one execution of step 2 followed by step 3. Tasks (states) with values not surrounded by boxes belong to $I^k$ ($S^k$). Values surrounded by boxes are from the previous iteration, and the corresponding tasks (states) do not belong to $I^k$ ($S^k$). Based on the given unit capacities, $\tilde{\mu}_i$ must be a multiple of 30 for T1 and is equal to $\mu_i$ for T2.

Figure 5:
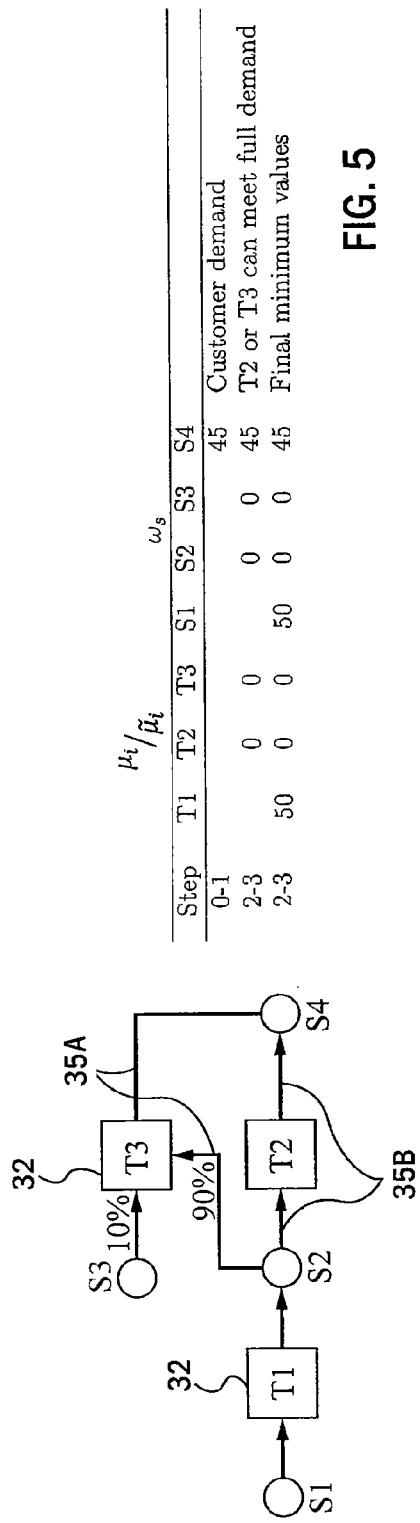
FIG. 5 is a simplified block diagram of a parallel branch in a process and a table showing the steps of applying the invention to such a process.

Referring now to FIG. 5, the present invention can also be applied to a case where tasks are in parallel as connected by parallel paths 35a and 35b. When multiple tasks can produce a state, equation 1 is insufficient as there is no way of knowing beforehand how much of a state each task must produce. Often it is possible for each task to meet the entire demand of the state, so each task will have a minimum production of zero. Instead, we solve a simple linear programming problem to find $\mu_i$:

$\mu_i = \min P_i$ such that:

$$\zeta_s^0 + \sum_{i' \in I_s^+} \rho^+_{i's} P_{i'} \geq \sum_{i' \in I_s^-} \rho^-_{i's} P_{i'} \ \forall \ s$$

$$\sum_{i' \in I_s^+} \rho^+_{i's} P_{i'} \geq \omega_s \ \forall \ s \in S^k$$

where:

$\mu_i$ is the minimum production for task i;
$P_i$ is a nonnegative variable denoting the total amount of material that task i produces for a particular solution of the linear programming problem;
$\omega_s$ is the minimum material amount for each material state s;
$I_s^-/I_s^+$ is the set of tasks that consume/produce material state s;
$\rho_{is}^-/\rho_{is}^+$ is the realization of task i indicating the amount of material state s consumed/produced by the task; and
$\zeta_s^0$ is the initial inventory of material state s.

The first constraint requires that, for each state, the amount produced plus any initial inventory is greater than the amount consumed. The second constraint enforces that the amount produced of a state must exceed $\omega_s$ and is only written for states for which $\omega_s$ is known. The objective is to minimize the production for task i and gives the value for $\mu_i$. Demand is still back-propagated according to the computer program of FIG. 3, and $\tilde{\mu}_i$ is still calculated after $\mu_i$; the only change is that we calculate $\mu_i$ with linear programming instead of with equation 1. This method should be used for all tasks for any network with a state that can be produced by multiple tasks and works even for networks with loops.

In FIG. 5, back-projection for a network where S4 is produced by multiple tasks where $\mu_i$ is found by linear programming. All units have a capacity of 0-20 kg, so any production amount is attainable and $\mu_i = \tilde{\mu}_i$. We assume that feeds S1 and S3 have unlimited initial inventory when solving the linear programming problem. Tasks (states) with values in black belong to $I^k$ ($S^k$).

Figure 6:
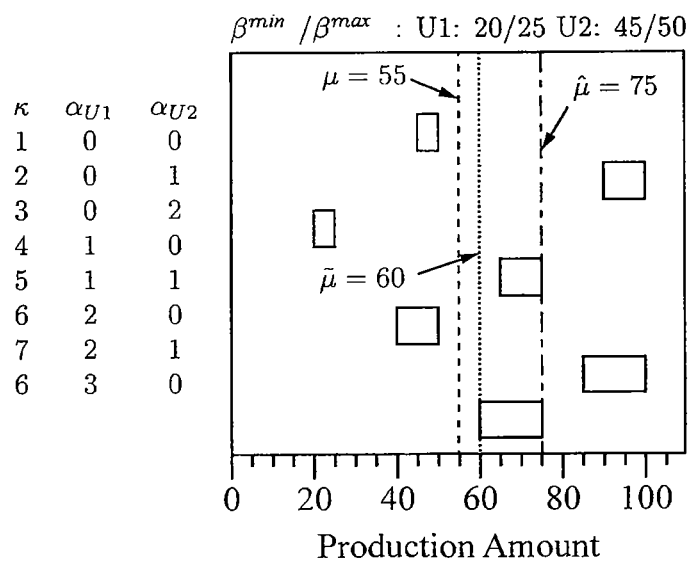
FIG. 6 is a chart of attainable production amounts.

Once $\mu_i$ is known, we must find the "attainable" production amount, $\tilde{\mu}_i$. When only one unit can process a task, it is straightforward to find the range of attainable production for any number of batches and to check if the required production is in one of those attainable ranges. When multiple units can process a task, we find and check attainable ranges, indexed by k, for every possible combination of batches. For example, if two units, U1 and U2, can process a task, then we check 1 batch in U1, 0 in U2; 0 in U1, 1 in U2; 1 in U1, 1 in U2; etc. The attainable range for a particular set of units is from $$\sum \alpha_j^k \beta_j^{min} \text{ to } \sum \alpha_j^k \beta_j^{max},$$

where $\alpha_j^k$ is the number of batches in unit j for range k, and $\beta_j^{max}$ ($\beta_j^{min}$) is the maximum (minimum) capacity of unit j. For example, consider a task which must process 55 kg and can be carried out in units U1 and U2 (FIG. 6). The attainable range for each unit combination is shaded in FIG. 6. Since $\mu_i = 55$ does not fall in an attainable range, $\tilde{\mu}_i$ is the production amount at the start of the next range and, for this example, is 60.

Once the attainable production amounts are known they may be used to provide tightening constraints to an MIP scheduling model.

Let $X_{ijt}^P$ be the assignment variable in a time-indexed MIP scheduling model, i.e., $X_{ijt}^P = 1$ if task i starts in unit j at time t. We write two types of tightening constraints once $\tilde{\mu}_i$ is known for all tasks ($J_i^P$ is the set of units that can process task i):

$$\sum_{j \in J_i^P, t} X_{ijt}^P \geq \left\lceil \frac{\tilde{\mu}_i}{\max_{j \in J_i^P} \{\beta_j^{max}\}} \right\rceil \ \forall \ i \quad (3)$$

$$\sum_{j \in J_i^P, t} \beta_j^{max} X_{ijt}^P \geq \tilde{\mu}_i \ \forall \ i \quad (4)$$

Figure 7:
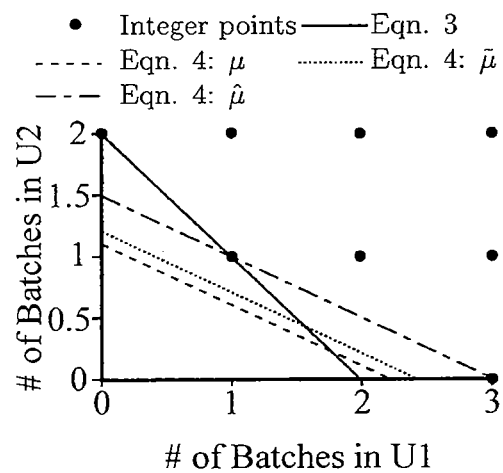
FIG. 7 is a chart showing the effect of tightening constraints on feasible regions.

The right-hand-side (RHS) of equation 3 is the minimum number of batches a task must process, which we find by dividing $\tilde{\mu}_i$ by the largest possible size of a single batch of task i and rounding up. The minimum number of batches gives a lower bound on the sum of $X_{ijt}^P$. However, when a task can be processed in units with very different capacities, equation 3 may not provide a tight bound; instead, equation 4 uses the maximum capacity and minimum production requirements. In equation 4, $\hat{\mu}_i$ is the smallest value (greater than) that the left-hand-side can be when all $X_{ijt}^P$ are binary. In FIG. 6, $\hat{\mu}_i$ is the production amount at the end the attainable region that is closest to but greater than $\tilde{\mu}_i$. FIG. 7 shows how the use of $\mu_i$ on the RHS of equation 4 provides a tighter formulation than using $\mu_i$ or $\hat{\mu}_i$.

When introducing elements or features of the present disclosure and the exemplary embodiments, the articles "a", "an", "the" and "said" and "set" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "the computer" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications are hereby incorporated herein by reference in their entireties.

We claim:

1. A system for scheduling manufacturing production in a multistep process having a set of tasks that may receive upstream input materials to produce downstream output materials, the system comprising:
   an electronic memory storing:
   (a) a model of the multistep process, the model defining an interconnection of the tasks according to a downstream material flow from a front end to a back end and defining, for each task, predetermined achievable ranges of production of material by the task based on corresponding physical implementations of the tasks; and
   (b) a desired amount of output materials from the multistep process;
   an electronic computer communicating with the electronic memory to access the model and executing a stored program to:
   (i) determine minimum productions $\mu_i$ for each task based on the physical implementations of the tasks;
   (ii) determine the attainable production $\tilde{\mu}_i$ for each task based on the physical implementations of the tasks and a desired output; and
   (iii) use the attainable productions for each task to provide tightening constraints $\hat{\mu}_i$ to a time-indexed MIP scheduling of the manufacturing production, the tightening constraints $\hat{\mu}_i$ providing tighter MIP scheduling constraints than $\mu_i$ and $\tilde{\mu}_i$.

2. A system of claim 1 wherein the electronic computer executes the stored program to perform a multi-step back-propagation from a back end of the model toward a front end of the model, the steps alternately:
   (i) determining minimum productions $\mu_i$ for given tasks based on the physical implementations of the tasks of the multistep process or attainable production $\tilde{\mu}_i$ for tasks based on the physical implementations of the tasks and the desired output immediately downstream from the given tasks; and
   (ii) determining attainable production $\tilde{\mu}_i$ of the given tasks based on the minimum productions $\mu_i$.

3. The system of claim 2 wherein the model includes task realization values indicating a fraction of the material that may be consumed or produced by the task.

4. The system of claim 3 wherein the model includes an initial inventory of material.

5. The system of claim 4 wherein the minimum production $\mu_i$ for each task i is according to an equation:

$$\mu_i = \max_{s \in S_i^+} \{\omega_s / \rho_{is}^+\}$$

where:
$\mu_i$ is the minimum production for task i;
$\omega_x$ is the minimum required amount of material state s output by task i;
$\rho_{is}^+$ the realization of task i indicating the amount of material state s produced by the task; and
$S_i^+$ is the set of material states produced by task i.

6. The system of claim 5 wherein the minimum material amount for each state i is the equation:

$$\omega_s = \max\left\{0, \sum_{i \in I_s^-} \rho_{is}^- \mu_i - \zeta_s^0\right\}$$

where:
$\omega_s$ is the minimum material amount for each state s;
$\rho_{is}^-$ is the realization of task i indicating the amount of material state s consumed by the task;
$\mu_i$ is the minimum production for task i, and $\zeta_s^0$ is the initial inventory of material state s.

7. The system of claim 6 wherein the model includes a recycle path providing an interconnection from a downstream task to an input of an upstream task and wherein the electronic computer executes the stored program to perform multiple iterations of the back projection with initial assumption of zero material flow through the recycle path.

8. The system of claim 7 wherein the model provides for parallel connected tasks and wherein the minimum production is determined by processing a linear programming problem to find:

$$\mu = \min P_i$$

such that:

$$\zeta_s^0 + \sum_{i' \in I_s^+} \rho_{i's}^+ P_{i'} \geq \sum_{i' \in I_s^-} \rho_{i's}^- P_{i'} \ \forall \ s$$

$$\sum_{i' \in I_s^+} \rho_{i's}^+ P_{i'} \geq \omega_s \ \forall \ s \in S^k$$

where:
$\mu_i$ is the minimum production for task i;
$P_i$ is a nonnegative variable denoting a total amount of material that task i produces for a particular solution of the linear programming problem;
$\omega_s$ is the minimum material amount for each material state s;
$I_s^-/I_s^+$ is the set of tasks that consume/produce material state s;
$\rho_{is}^-/\rho_{is}^+$ is the realization of task i indicating the amount of state consumed/produced by the task; and
$\zeta_s^0$ is the initial inventory of material state s.

9. A method for scheduling manufacturing production in a multistep process having a set of tasks that may receive upstream input materials to produce downstream output materials, the method performed on an electronic computer system executing a program stored in a non-transient medium and accessing an electronic memory storing: (a) a model of the multistep process, the model defining an interconnection of the tasks according to a downstream material flow from a front end to a back end and defining, for each task, predetermined achievable ranges of production of material by the task based on corresponding physical implementations of the tasks; and (b) a desired amount of output materials from the multistep process;
the method comprising the steps of:
(a) determining minimum productions $\mu_i$ for each task based on the physical implementations of the tasks;
(b) determining attainable production $\tilde{\mu}_i$ for each task based on the physical implementations of the tasks and a desired output; and
(c) using the attainable productions for each task to provide tightening constraints $\hat{\mu}_i$ to a time-indexed MIP scheduling of the manufacturing production, the tightening constraints $\hat{\mu}_i$ providing tighter MIP scheduling constraints than $\tilde{\mu}_i$ and $\mu_i$.

10. The method of claim 9 wherein the electronic computer executes the stored program to perform a multi-step back-propagation from a back end of the model toward a front end of the model, the steps alternately:
(i) determining minimum productions $\mu_i$ from given tasks based on the physical implementations of the tasks or attainable production $\tilde{\mu}_i$ of tasks based on the physical implementations of the tasks and the desired output immediately downstream from the given tasks; and
(ii) determining attainable production $\tilde{\mu}_i$ for the given tasks based on the minimum productions $\mu_i$.

11. The method of claim 10 wherein the model includes task realization values indicating a fraction of the material that may be consumed or produced by the task.

12. The method of claim 11 wherein the model includes an initial inventory of material.

13. The method of claim 12 wherein the minimum production $\mu_i$ for each task i is according to an equation:

$$\mu_i = \max_{s \in S_i^+} \{\omega_s / \rho_{is}^+\}$$

where:
$\mu_i$ is the minimum production for task i;
$\omega_s$ is the minimum required amount of material state s;
$\rho_{is}^+$ is the realization of task i indicating the amount of material state s produced by the task; and
$S_i^+$ is the set of material states produced by task i.

14. The method of claim 13 wherein the minimum material amount for each, state s is the equation:

$$\omega_s = \max\left\{0, \sum_{i \in I_s^-} \rho_{is}^- \mu_i - \zeta_s^0\right\}$$

where:
$\omega_s$ is the minimum material amount for each state s;
$\rho_{is}^-$ is the realization of task i indicating the amount of material state s consumed by the task;
$\mu_i$ is the minimum production for task i; and
$\zeta_s^0$ the initial inventory of material state s.

15. The method of claim 14 wherein the model includes a recycle path providing an interconnection from a downstream task to an input of an upstream task and wherein the electronic computer executes the stored program to perform multiple iterations of the back projection with an initial assumption of zero material flow through the recycle path.

16. The method of claim 15 wherein the model provides for parallel connected tasks and wherein the minimum production is determined by computing a linear programming solution to find:

$\mu_i = \min P_i$ such that:

$$\zeta_s^0 + \sum_{i' \in I_s^+} \rho_{i's}^+ P_{i'} \geq \sum_{i' \in I_s^-} \rho_{i's}^- P_{i'} \ \forall \ s$$

$$\sum_{i' \in I_s^+} \rho_{i's}^+ P_{i'} \geq \omega_s \ \forall \ s \in S^k$$

where:
$\mu_i$ is the minimum production for task i;
$P_i$ is a nonnegative variable denoting a total amount of material that task i produces for a particular solution of the linear programming problem;
$\omega_s$ is the minimum material amount for each material state s;
$I_s^-/I_s^+$ is the set of tasks that consume/produce material state s;
$\rho_{is}^-/\rho_{is}^+$ is the realization of task i indicating the amount of state consumed/produced by the task; and
$\zeta_s^0$ is the initial inventory of material state s.

* * * * *

UNITED STATES PATENT AND TRADEMARK OFFICE
CERTIFICATE OF CORRECTION

PATENT NO. : 9,146,550 B2  Page 1 of 1
APPLICATION NO. : 13/561891
DATED : September 29, 2015
INVENTOR(S) : Christos T. Maravelias It is certified that error appears in the above-identified patent and that said Letters Patent is hereby corrected as shown below:

IN THE CLAIMS

CLAIM 5, Col. 8, Line 37

Delete "$\omega_x$" and substitute therefor

-- $\omega_s$ --

Signed and Sealed this
Second Day of August, 2016

Michelle K. Lee
*Director of the United States Patent and Trademark Office*